United States Patent
Schlesinger

[15] 3,666,985
[45] May 30, 1972

[54] HIGH RESOLUTION ELECTRON OPTIC SYSTEM FOR CAMERA TUBES

[72] Inventor: Kurt Schlesinger, Fayetteville, N.Y.
[73] Assignee: General Electric Company
[22] Filed: Oct. 20, 1969
[21] Appl. No.: 867,829

[52] U.S. Cl. ............................................................. 315/31
[51] Int. Cl. .......................................................... H01j 29/56
[58] Field of Search .................................................. 315/31

[56] References Cited

UNITED STATES PATENTS

| | | | |
|---|---|---|---|
| 3,375,390 | 3/1968 | Schlesinger | 315/31 |
| 3,319,110 | 5/1967 | Schlesinger | 315/31 |
| 3,327,160 | 6/1967 | Schlesinger | 315/31 |
| 3,409,799 | 11/1968 | Korzweil, Jr. et al. | 315/31 |
| 3,374,386 | 3/1968 | Chabonnier et al. | 315/31 |

Primary Examiner—Rodney D. Bennett, Jr.
Assistant Examiner—N. Moskowitz
Attorney—Nathan J. Cornfeld, John P. Taylor, Frank L. Neuhauser, Oscar B. Waddell and Joseph B. Forman

[57] ABSTRACT

A high resolution electron optic system for camera tubes comprises a demagnification focusing stage which forms a primary focus which is a demagnified real image of a small spot-defining aperture. This primary focus is then projected into the FPS cavity. Much higher resolution and greater beam currents can be obtained.

Correction of scan distortion resulting from the cycloidal motion of the beam in the FPS cavity is obtained by twisting the deflection electrodes bounding the FPS cavity.

5 Claims, 3 Drawing Figures

Patented May 30, 1972
3,666,985
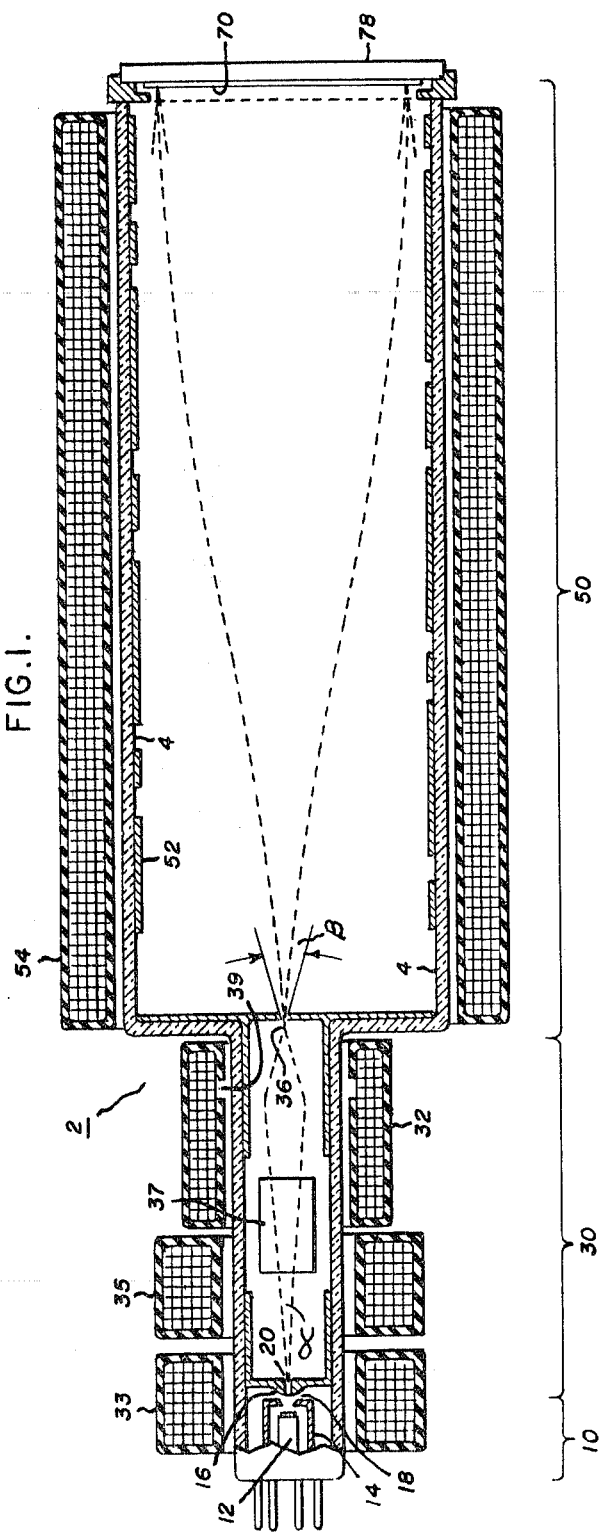
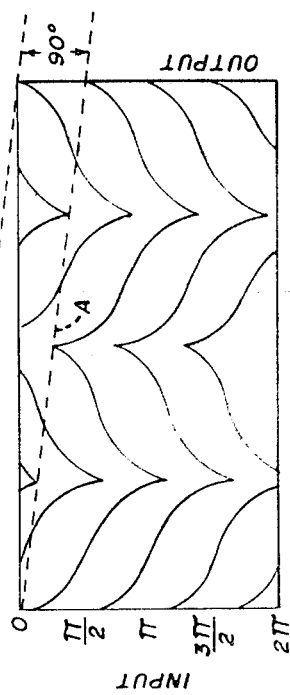
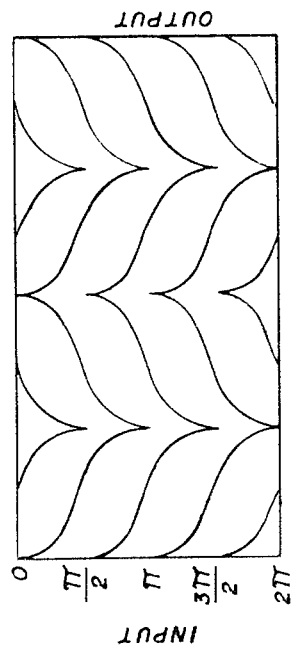
INVENTOR:
KURT SCHLESINGER,
BY John P. Taylor
HIS ATTORNEY.

HIGH RESOLUTION ELECTRON OPTIC SYSTEM FOR CAMERA TUBES

BACKGROUND OF THE INVENTION

This invention relates to camera tubes and more particularly to improvements in particular systems for simultaneously electrostatically deflecting and magnetically focusing electron beams in a camera tube. Simultaneous magnetic focusing and electrostatic deflection of the electron beam is known by the acronym FPS which stands for focusing, projection and scanning in one common volume or cavity.

Modern applications for electron beam tubes often require high image resolution, high beam current density, with minimum power requirements, size, and weight. All-electrostatic and all-magnetic electron optical systems are unable to meet these requirements. The former is inherently a long beam system limited by aberrations to small deflection angles and low current density. The latter system is bulky, heavy, and requires a large amount of power.

U.S. Pat. No. 3,319,110 issued May 9, 1967, and assigned to the assignees of this invention discloses a novel mixed field or "FPS" system for electrostatically deflecting and magnetically focusing an electron beam. In the system therein described, the FPS cavity focuses a projected electron image of an object aperture onto the target while simultaneously deflecting this image across the target area in accordance with the signals applied to the electrostatic yoke. The latter utilizes four interleaved deflection electrodes which circularly extend about 270° around a cylinder or cone in zig-zag fashion to generate a uniform electrostatic field of controlled strength and direction in the cavity.

While the system described in the above patent has been found to produce excellent results with regard to compact size and weight, unity of magnification or less, absence of beam-interception after the object aperture, improved collimation, magnetic self-shielding, and high resolution, it has been found that substantially higher resolution and, under certain operating conditions, less distortion and shading can be obtained in accordance with the improvements constituting this invention.

In tubes of the FPS type, the physical size of the electron focus, scanning the target, is proportional to the size of the built-in object aperture. The smaller the aperture forming the object-window in an FPS system the higher the resolution. However, mechanical limitations inhibit formation of a precision aperture of less than one-half mil diameter. Furthermore, physical reduction of this opening results in a substantial loss of beam current.

It has also been found the control of the position and shape of the object aperture is desirable, since this permits external control of shading and inter-line flicker.

SUMMARY OF THE INVENTION

It is therefore an object of the invention to provide an improved optical system for camera tubes which is capable of very high resolution. More specifically it is a further object of the invention to provide an optical system capable of high resolution which uses a first focus lens means to form and position a first focus which is a demagnified image of a small object aperture. It is another object of the invention to provide an optic system of the FPS type having improved means for correction of scan distortion. Other objects of the invention will be apparent.

In accordance with the invention a high resolution camera tube has an improved electron optical system comprising emitting means for providing a beam of electrons inside and adjacent one end of an evacuated envelope, and lens means for shaping and forming the electron beam to form a primary focus or "crossover" before deflection of the beam which comprises a demagnified real image of the object aperture, and relay means, including a target, to refocus the first focus into a second focus. The lens means are arranged coaxially along the tube axis in at least a portion of the space between the object aperture and the intended-crossover position. The relay means commence adjacent the focus, or crossover, point and extend coaxially along the tube axis to a point adjacent the target, simultaneously magnetically focus and electrostatically deflecting the beam. The electrostatic deflection comprises two pairs of electrodes symmetrically positioned on tubular means, such as an insulating cylinder or cone, mounted coaxially within the tube. Alternatively the electrodes can be carried by the inner surface of the tube wall. The above electrodes are generally of zig-zag shape with apex portions angularly extending in opposite directions around the tubular means.

BRIEF DESCRIPTION OF THE DRAWINGS

FIG. 1 is a longitudinal section view of a preferred embodiment of the invention.

FIG. 2 is a plane development of a deflection electrode configuration.

FIG. 3 is a modification of the electrode configuration of FIG. 2.

DETAILED DESCRIPTION

Referring now to FIG. 1, the camera tube embodying the improved electron optic system of the invention generally is indicated at 2. Tube 2, in certain aspects, is similar to the tube shown in my previous U.S. Pat. No. 3,319,110 issued May 9, 1967, and assigned to the assignee of this invention. Tube 2 generally comprises an electron beam section 10, a primary focusing section 30, a FPS or relay cavity reduction 50, and a target 70, all housed within an evacuated glass envelope 4. Target 70, in the embodiment illustrated, is a coating on the inner surface of the faceplate 78 of envelope 4.

In a preferred embodiment, electron beam emitting section 10 comprises a cathode 12, a shaping electrode 14, and an accelerating electrode 16. Electrode 16 has a central passage 18 in axial alignment with cathode 12. Central passage 18 communicates with a defining aperture 20 which serves as the real object in the electron optic system of the invention. The aforementioned electrodes are energized from appropriate potential sources (not shown). The electron beam source illustrated is similar to that disclosed and claimed in U.S. Pat. No. 3,346,583 assigned to the assignee of this invention.

Other electron beam emitting systems can also be used with the invention such as, for example, the electron beam emitting system disclosed in my U.S. Pat. No. 2,995,676 also assigned to the assignee of this invention. Generally speaking, however, the electron beam emitting means must be capable of permitting controlled size of source, limited beam divergence, high current density, and modulation capability.

A beam crossover occurs at, or near, the defining aperture 20; this defining aperture thus serving as the real object of the electron optical system of the invention. Aperture 20 is substantially coincident with the axis of tube 20. The diameter of aperture 20, in accordance with the invention, should be as small as possible to obtain the highest possible resolution without unduly decreasing beam current or increasing the divergence of the beam as will be explained presently. Preferably the aperture is about one-half mil or less in diameter.

Electrode 18, containing aperture 20, is spaced a predetermined distance from FPS cavity 50. The intervening space defines a primary focus cavity 30 in which the beam is focused by magnetic means to form a demagnified image of aperture 20 at or near the entrance to FPS cavity 50 thus forming a primary focus or crossover 36.

Coaxially surrounding a portion of focus cavity 30 is magnetic focus and demagnification coil or solenoid 32. Coil 32, which is energized by an appropriate power supply (not shown) is on the outside of envelope 4 and is positioned along the axis of tube 2 as close as possible to FPS cavity 50. The position of coil 32, the length of cavity 30 and the field strength of coil 32 are adjusted to provide a demagnified image of the object-defining aperture 20 with a magnification from about one-half to one-third. As illustrated in FIG. 1, positioning and length of coil 32 around cavity 30 should be such that the equivalent thin lens of coil 32 should move to a point along the axis of tube 2 which is about two-thirds to three-quarters of the distance from aperture 20 to FPS cavity 50. In the preferred embodiment shown in FIG. 1, coil 32 has a gap 39 in the shielding as close to cavity 50 as mechanically possible to provide a single focus rather than a plurality of focal points. The object length from aperture 20 to the so-formed magnetic electron lens is then two to three times the image length resulting in the desired demagnification of the spot. Alternatively coil 32 can be replaced by a permanent magnet of sufficient strength to provide a similar magnetic field or a combination of fields.

It should also be mentioned, in this connection, that the achievement of true demagnification is more readily achieved with coils of reduced diameter. For this reason, a reduction of the tube-neck diameter in the region of coil 32 is useful.

As will be apparent by inspection of the dotted lines in cavity 30 in FIG. 1 representing the divergence and convergence of the electron beam, the divergence angle $\alpha$ of the beam at aperture 20 is smaller than the divergence angle $\beta$ of the beam leaving primary focus point 36. The ratio of angles $\alpha$ and $\beta$ is inversely proportional to the demagnification of the object, aperture 20, at focus point 36. Since a large divergence angle can result in spherical aberration in the FPS cavity a higher ratio of demagnification of a larger diameter aperture 20, while giving a higher resolution desired, would provide a larger divergence angle $\beta$ resulting in unsatisfactory increase of spot size. Thus the range of aperture size and demagnification ratios of the magnetic lens are rather critical to maintenance of balance between high resolution and low spherical aberration.

It should be noted here that while demagnified focus point 36 could be formed using an electrostatic lens, a magnetic lens is preferred because aberrations of a magnetic lens, both spherical and chromatic are generally smaller than that of an electrostatic lens in a given situation, including a given beam-diameter and tube-neck diameter.

The location of primary focus point 36 at the entrance to FPS or relay cavity 50, as well as the ability to shift this imaged focus point slightly along the axis, by shift of focus coil 32 or by simultaneous, and opposite, variation of ampere turns in both coil 32 and coil 54, enables one to accurately establish the dwell phase of the beam on its passage from focus point 36 through the FPS cavity to target 70 as well as make minor compensating adjustments thereto. The effect of dwell phase on landing accuracy and shading as well as the mathematical formulas for computing the dwell phase of the beam are fully explained in my aforementioned U.S. Pat. No. 3,319,110.

Other coils for the control of beam alignment and shaping of the beam spot, such as for example coils 33 and 35, as well as electrostatic focus for the dynamic control of the primary focus point position along the tube axis, such as for example cylinder 37, can also be employed in the electron optic system of the invention.

FPS cavity 50 is located within envelope 4 between focus cavity 30 and target 70. FPS cavity 50 generally comprises a cylindrical volume bounded by an electrostatic deflection yoke 52 and focusing solenoid 54. Solenoid 54 is positioned over the exterior surface of envelope 4, and is generally coaxial with the axis of tube 2. Solenoid 54 is energized by an appropriate power source (not shown). Alternatively permanent magnets can be used in place of solenoid 54 to provide a similar magnetic field.

Electrostatic yoke 52, which will be described in more detail below, is generally of the type which provides simultaneous horizontal and vertical deflection forces on the beam by employing pairs of interleaved horizontal and vertical deflection electrodes such as is shown in U.S. Pat. No. 3,319,110. Electrostatic yoke 52 may be attached or formed on the interior surface of envelope 4 (as illustrated) by plating, coating or the like or it can be formed on an independent tubular insulative support member. The yoke may thus be cylindrical or conical in form, it being understood that the term tubular is intended to include both forms.

As fully described in my aforementioned patent, the electrostatic yoke 52 generates, in response to appropriate energization, a rotatable, bi-axial, electric field orthogonal to the magnetic field generated by solenoid 54 and substantially uniform over the volume of FPS cavity 50. The electric field must be essentially transverse and uniform, i.e., free of any components which would tend to provide defocusing and rotational effects. Solenoid 54 and electrostatic yoke 52 thus generate cross electric and magnetic fields which are substantially co-extensive within the central portion of envelope 4 to form FPS cavity 50. The magnetic field is static whereas the electric field is dynamic, varying in accordance with the applied deflection signals.

The target or screen 70 is positioned at the end of envelope 4 opposite electron beam section 20 and lies in a plane substantially perpendicular to the axis of tube 2. Target 70 is illustrated as located on an end wall 78 of envelope 4 merely for illustrative purposes, it being understood that various types of targets, target mesh electrodes, and the like may be provided which form no part of the invention.

Insofar as described above, the FPS cavity portion of the electron optical system of the invention operates as set forth in my above referred to U.S. Pat. No. 3,319,110. Observation, however, has shown that a rhombic keystone or S-type distortion is sometimes produced, particularly in narrow tubes with high fill factors. This problem is overcome by use of the deflection electrodes of the invention which may be referred to as a "twisted" deflection yoke to distinguish this novel yoke from prior art deflection yokes.

As mentioned above, electrostatic yoke 52 comprises two pairs of interleaved electrodes. As explained more fully in my publication "Internal Electrostatic Deflection Yokes" Electronics, Volume 25, pp 105–109, July, 1952, the use of interleaved electrodes which generally longitudinally extend in zig-zag fashion circumferentially about a tubular form, to about 225°–270°, provides an electrostatic deflection field equivalent to the simultaneous placement on the envelope perimeter of a parallel pair of x-axis electrodes and a pair of y-axis electrodes but without the field distortion which would otherwise occur if non-interleaved electrodes were used. Such a yoke is shown in FIG. 2.

In FIG. 3, the twisted deflection yoke which can be used in the electron optic system of the invention to correct rhombic or keystone distortion is shown. In FIG. 3, the entire printing now leans or twists to the right through a sufficient angle to equal, in space, the radial twisting of the output of the yoke by 90° relative to the input end. This is best seen by referring to dotted line A in FIG. 3 and its relationship to electrode 52a. In practice this results in increased deflection sensitivity and improved image geometry.

Since in the above, nothing has been said of the magnetic field except that it is parallel to the longitudinal axis of the FPS cavity, it should be noted that, to obtain such results, the magnetic field must be "favorable". Favorable and unfavorable magnetic fields are explained in U.S. Pat. No. 3,319,110. Briefly, the effect is due to the "right-hand" or "left-hand" spiral of the pairs of interleaved electrodes with respect to the cycloidal orbiting which is determined by the polarity of the magnetic field. If the magnetic field is "unfavorable", i.e., if the beam orbits opposite to the twist of the deflection pattern, scans are obtained which are more, rather than less, distorted than results with standard patterns using conventional i.e., non-twisted deflectrons.

Thus, the invention provides an improved electron optical system for camera tubes of the simultaneous electrostatic deflection and magnetic focusing type which retains the lightweight compact size of such tubes, increases the high resolution characteristics, of such tubes, and which eliminates the pin cushion or rhombic distortion hereinbefore experienced. It will be obvious to those skilled in the art that various minor modifications may be made without departing from the spirit of the invention which is to be limited only by the scope of the appended claims.

What I claim as new and desire to secure by Letters Patent of the United States is:

1. A high resolution electron optic system for a camera tube comprising:
   a. Electron emitting means inside and adjacent one end of an evacuated envelope and target means spaced therefrom;
   b. Object means adjacent said electron emitting means including an aperture of substantially 0.5 mil diameter to form a narrow beam of electrons;
   c. Magnetic means for forming a focus point comprising a demagnified real image of substantially one-half to one-third of said aperture, said magnetic means axially extending along the electron beam path from a point spaced from said aperture and extending to said focus point along the axis of said tubular envelope;
   d. FPS means commencing adjacent said focus point and extending longitudinally coaxial along said tubular axis to a point adjacent said target to simultaneously magnetically focus and electrostatically deflect said beam.

2. The electron optic system of claim 1 wherein said FPS means include an electrostatic deflection yoke having electrodes thereon which are radially twisted on the yoke through a sufficient angle that a given electrode intersects a point on the output of the yoke 90° radially with respect to a point on the input of the yoke intersecting the same electrode.

3. A high resolution optic system for a camera tube having low distortion comprising:
   a. Electron emitting means inside and adjacent one end of an evacuated envelope and target means spaced therefrom;
   b. Object means adjacent said electron emitting means including a physical aperture having a diameter of substantially one-half mil to form a narrow beam of electrons;
   c. Magnetic means for forming a focus point comprising a demagnified real image of said aperture, said magnetic means axially extending along the electron beam path from a point spaced from said aperture and extending to said focus point along the axis of said tubular envelope;
   d. FPS means commencing adjacent said focus point and extending longitudinally coaxial along said tubular axis to a point adjacent said target to simultaneously magnetically focus and electrostatically deflect said beam, said FPS means including longitudinally-extending, generally tubular insulative means through which the beam passes, said means having two pairs of electrodes symmetrically positioned thereon with respect to each other, each of the electrodes extending longitudinally on the surface of said tubular means and being of zig-zag shape with apex portions angularly extending in opposite directions around said tubular means, said electrodes being of such configuration that the electrostatic field produced by applying a voltage to opposite electrodes has an effective angular extent of 180°, said electrodes being further characterized by a twist configuration such that a line passing through the apices of one of the electrodes intersects a point on the plane normal to the axis of said tubular means at the input end radially positioned 90° from a corresponding point intersected by the same line on the plane normal to the axis of said tubular means at the output end.

4. A high resolution electron optic system for a camera tube having low distortion comprising:
   a. an evacuated envelope having therein electron emitting means at one end thereof and target means spaced therefrom;
   b. object means adjacent said electron emitting means including a physical aperture having a diameter of substantially one-half mil to form a narrow beam of electrons;
   c. a first focusing stage commencing adjacent said object means and extending to a first focus point spaced therefrom;
   d. magnetic focusing means to control the beam in said first focus stage and to provide a demagnified image of said aperture at said first focus point;
   e. a second focusing stage commencing adjacent said first focus point and extending longitudinally coaxial with the axis of said tube to a point adjacent said target comprising magnetic focus means to provide a focus of said beam on said target; and
   f. electrostatic deflection means in said second stage cooperating with said magnetic focus means to simultaneously magnetically focus and electrostatically deflect said beam, said deflection means comprising two pairs of electrodes symetrically positioned on tubular insulating means generally coaxial to the axis of the tube, each of the electrodes extending longitudinally on the surface of said tubular means and being of zig-zag shape with apex portions angularly extending in opposite directions around said tubular means so that voltage applied to opposite electrodes has an effective angular extent of 180°, said zig-zag shape of said electrodes generally defining a twisted configuration longitudinally along said tubular means such that a line drawn along the apices of an electrode intersects a point on the plane normal to the axis of said tubular means at one end of said means rotated 90° with respect to a corresponding point formed by the same line intersecting a parallel plane passing through said tubular means at its opposite end.

5. The electron optic system of claim 1 wherein said FPS means include electrostatic deflection means comprising a tubular insulating means having four interleaved deflection electrodes thereon which circularly extend around said tubular means in zig-zag fashion with apex portions angularly extending in opposite direction around said tubular means and being positioned on said tubular means so that the longitudinally projection of each electrode along said means generally defines a twisted pattern such that the position of a given electrode is radially rotated 90° along the tubular means from a point on the input end of said tubular means to a corresponding point on the output end of said tubular means.

* * * * *

UNITED STATES PATENT OFFICE
CERTIFICATE OF CORRECTION

Patent No. 3,666,985   Dated May 30, 1972

Inventor(s) Kurt Schlesinger

It is certified that error appears in the above-identified patent and that said Letters Patent are hereby corrected as shown below:

Claim 3, line 1, add "electron" after "resolution".

Signed and sealed this 12th day of September 1972.

(SEAL)
Attest:

EDWARD M. FLETCHER, JR.
Attesting Officer

ROBERT GOTTSCHALK
Commissioner of Patents